US012667112B2

(12) United States Patent
Rohfritsch et al.

(10) Patent No.: US 12,667,112 B2
(45) Date of Patent: Jun. 30, 2026

(54) GLYCYRRHIZA AND THE PREVENTION OF LC-PUFA OXIDATION

(71) Applicant: SOCIETE DES PRODUITS NESTLE S.A., Vevey (CH)

(72) Inventors: Zhen Rohfritsch, Lausanne (CH); Francesca Giuffrida, Mezieres (CH)

(73) Assignee: Societe des Produits Nestle S.A., Vevey (CH)

( * ) Notice: Subject to any disclaimer, the term of this patent is extended or adjusted under 35 U.S.C. 154(b) by 514 days.

(21) Appl. No.: 17/762,192

(22) PCT Filed: Sep. 24, 2020

(86) PCT No.: PCT/EP2020/076678
§ 371 (c)(1),
(2) Date: Mar. 21, 2022

(87) PCT Pub. No.: WO2021/058632
PCT Pub. Date: Apr. 1, 2021

(65) Prior Publication Data
US 2022/0369660 A1      Nov. 24, 2022

(30) Foreign Application Priority Data

Sep. 24, 2019      (EP) ..................................... 19199246

(51) Int. Cl.
*A23B 20/30*          (2025.01)
*A23D 9/007*          (2006.01)
(Continued)

(52) U.S. Cl.
CPC .............. *A23B 20/30* (2025.01); *A23D 9/007* (2013.01); *A23L 33/105* (2016.08); *A23L 33/12* (2016.08)

(58) Field of Classification Search
CPC ......... A23D 9/06; A23D 9/007; A23L 33/105; A23L 33/12; A23L 2/44; A23L 27/10;
(Continued)

(56) References Cited

U.S. PATENT DOCUMENTS 2,205,620 A * 6/1940 Crocker ................ C11B 5/0085
554/191
2,511,428 A * 6/1950 Buxton ................. C11B 5/0085
554/80

(Continued)

FOREIGN PATENT DOCUMENTS

CN          101422201          5/2009
CN          106962506          7/2017
(Continued)

*Primary Examiner* — Drew E Becker
(74) *Attorney, Agent, or Firm* — K&L Gates LLP

(57)          ABSTRACT
The present invention relates generally to the field of the LC-PUFA containing compositions. For example, the present invention relates to at least partially preventing, inhibiting, reducing and/or stopping the oxidation of LC-PUFA in a composition. An embodiment of the present invention relates to a composition comprising at least one LC-PUFA containing oil and *Glycyrrhiza*, a part and/or an extract thereof. Another embodiment of the present invention relates to the use of *Glycyrrhiza*, a part and/or an extract thereof in compositions comprising an LC-PUFA containing oil to at least partially prevent, inhibit, reduce and/or stop the oxidation of LC-PUFA in the composition.

13 Claims, 4 Drawing Sheets

(51) Int. Cl.
  *A23L 33/105*     (2016.01)
  *A23L 33/12*      (2016.01)

(58) Field of Classification Search
  CPC ........ A23L 27/11; A23L 27/14; A23L 33/115;
    C11B 5/0085; A23V 2200/02; A23V
    2250/186–1886; A23V 2250/1876; A23V
    2250/1882; A23V 2250/21; A23V
    2250/20–2138
  See application file for complete search history.

(56)                References Cited

U.S. PATENT DOCUMENTS

| | | | | |
|---|---|---|---|---|
| 3,585,044 | A * | 6/1971 | Koski | A23L 2/52 |
| | | | | 426/599 |
| 5,156,865 | A * | 10/1992 | Gudas | A23G 4/066 |
| | | | | 426/534 |
| 5,660,870 | A * | 8/1997 | Schantz | A23L 27/70 |
| | | | | 426/655 |
| 5,855,944 | A | 1/1999 | Koschinski et al. | |
| 6,428,832 | B2 * | 8/2002 | Van Den Burg | A23D 9/05 |
| | | | | 426/601 |
| 2005/0118288 | A1 * | 6/2005 | Yamashita | A61K 31/56 |
| | | | | 424/757 |
| 2005/0118289 | A1 * | 6/2005 | Ikehara | A61P 25/04 |
| | | | | 426/601 |
| 2006/0165820 | A1 * | 7/2006 | Yatcilla | A61K 9/2059 |
| | | | | 424/774 |
| 2006/0204595 | A1 * | 9/2006 | Park | A61K 36/31 |
| | | | | 424/736 |
| 2007/0243307 | A1 * | 10/2007 | Abril | A23D 9/00 |
| | | | | 426/601 |
| 2008/0026125 | A1 * | 1/2008 | Mori | C11C 3/10 |
| | | | | 426/612 |
| 2008/0286254 | A1 * | 11/2008 | Sakamoto | A61P 3/02 |
| | | | | 424/641 |
| 2010/0159040 | A1 * | 6/2010 | Ge | A61K 36/488 |
| | | | | 424/725 |
| 2014/0170247 | A1 * | 6/2014 | Hendler | A61K 33/34 |
| | | | | 424/732 |
| 2016/0256556 | A1 * | 9/2016 | Kasama | A23G 9/44 |
| 2017/0281703 | A1 * | 10/2017 | Glynn | A61K 31/353 |
| 2019/0098922 | A1 * | 4/2019 | Reh | A23L 29/212 |
| 2020/0221742 | A1 * | 7/2020 | Takeuchi | A23L 19/01 |
| 2020/0306173 | A1 * | 10/2020 | Tran | A61Q 11/00 |
| 2022/0378810 | A1 * | 12/2022 | Watson | A23K 20/147 |

FOREIGN PATENT DOCUMENTS

| | | | |
|---|---|---|---|
| EP | 2025237 | 2/2009 | |
| EP | 3056090 | 8/2016 | |
| WO | WO-2016102325 A1 * | 6/2016 | A23C 11/04 |

* cited by examiner

Figure: 1
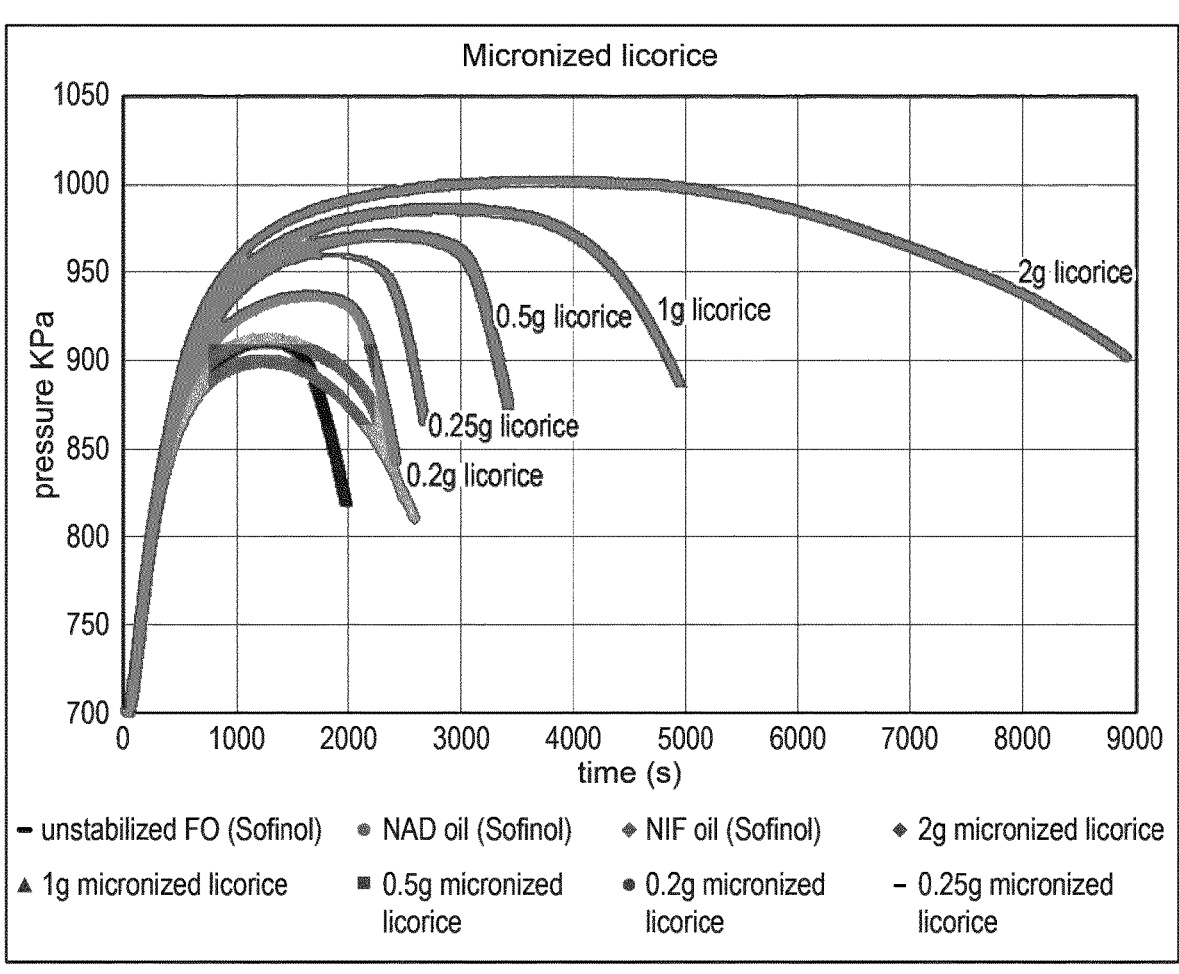

Figure: 2
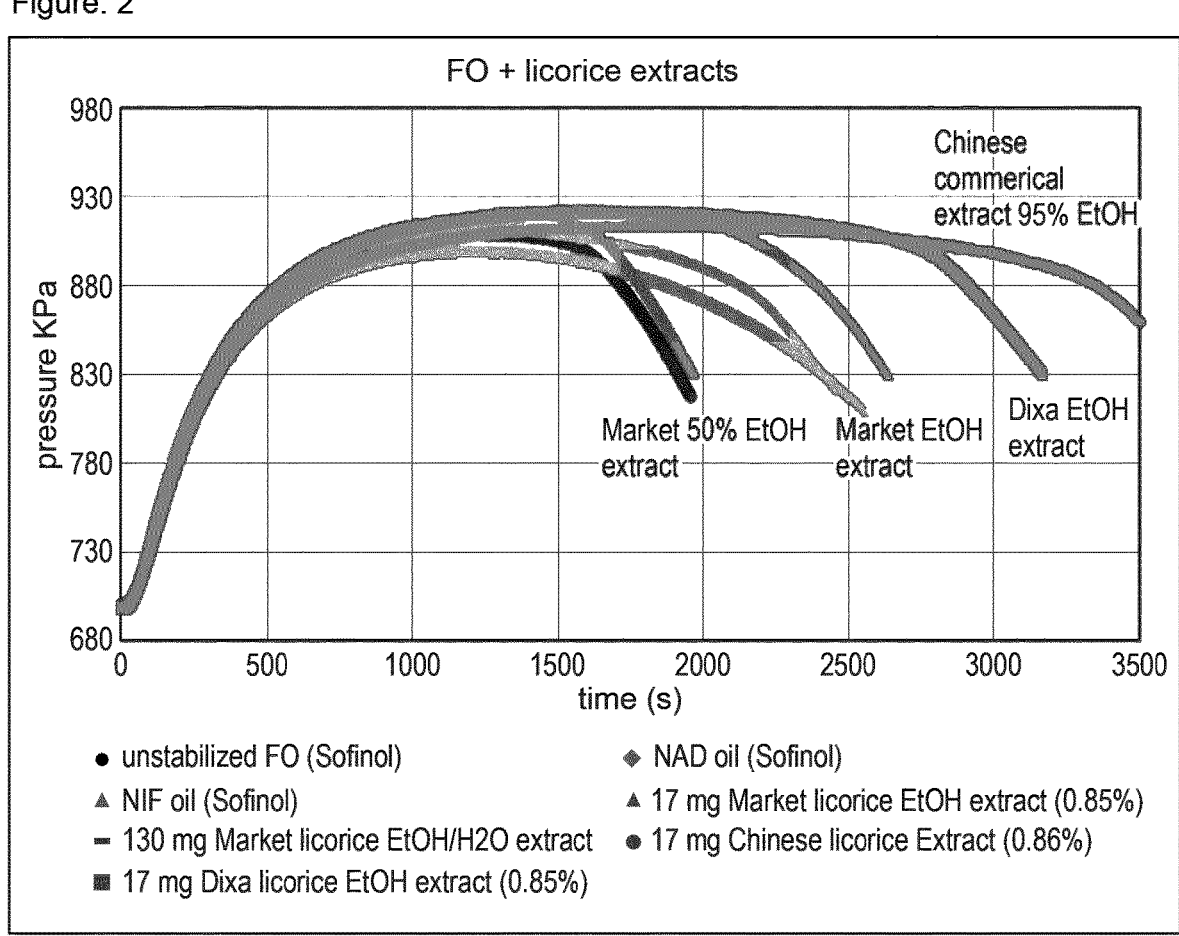

Figure: 3
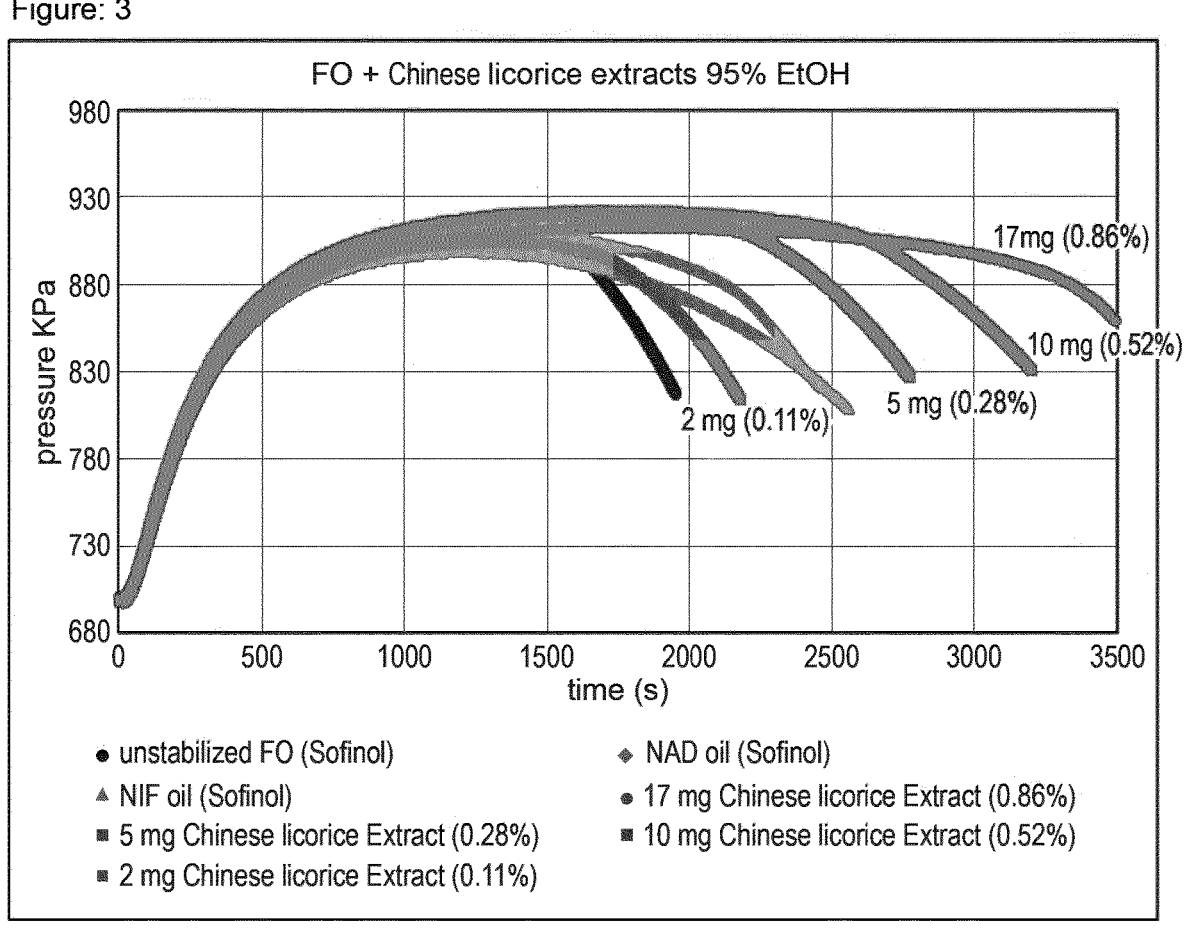

Figure 4:

| Sample ID | sample weighing | IP (min) |
|---|---|---|
| 2g micronized licorice | 2 g | 147.82 |
| 1g micronized licorice | 1 g | 82 |
| 0.5g micronized licorice | 0.5 g | 56.5 |
| 0.25g micronized licorice | 0.25 g | 44.15 |
| 0.2g micronized licorice-1 (10%) | 0.2 g | 39.9 |
| 0.2g micronized licorice-2 (10%) | 0.2 g | 42.7 |
| 17 mg Market licorice EtOH extract (0.86%) | 17.03 mg | 43.97 |
| 130 mg Market licorice EtOH/H2O extract | 130.5 mg | 32.75 |
| 17 mg Dixa licorice EtOH extract (0.86%) | 17.23 mg | 52.77 |
| 130 mg Dixa licorice EtOH/H2O extract | 130.51 mg | 33.77 |
| 17 mg Chinese licorice 95% EtOH extract (0.86%) | 17.115 mg | 61.7 |
| 10 mg Chinese licorice 95% EtOH extract (0.52%) | 10.4 mg | 53.42 |
| 5 mg Chinese licorice 95% EtOH extract (0.28%) | 5.55 mg | 46.25 |
| 2 mg Chinese licorice 95% EtOH extract (0.11%) | 2.3 mg | 36.38 |
| unstabilized FO (Sofinol) | 2 g | 32.57 |
| NAD oil (Sofinol) | 2 g | 40.95 |
| NIF oil (Sofinol) | 2 g | 42.72 |

GLYCYRRHIZA AND THE PREVENTION OF LC-PUFA OXIDATION

CROSS REFERENCE TO RELATED APPLICATIONS

The present application is a National Stage of International Application No. PCT/EP2020/076678, filed on Sep. 24, 2020. which claims priority to European Patent Application No. 19199246.0, filed on Sep. 24, 2019, the entire contents of which are being incorporated herein by reference.

The present invention relates generally to the field of the LC-PUFA containing compositions. For example, the present invention relates to at least partially preventing, inhibiting, reducing and/or stopping the oxidation of LC-PUFA in a composition. An embodiment of the present invention relates to a composition comprising at least one LC-PUFA containing oil and *Glycyrrhiza*, a part and/or an extract thereof. Another embodiment of the present invention relates to the use of *Glycyrrhiza*, a part and/or an extract thereof in compositions comprising an LC-PUFA containing oil to at least partially prevent, inhibit and/or stop the oxidation of LC-PUFA in the composition.

BACKGROUND

The importance of long chain polyunsaturated fatty acids (LC-PUFA) in the diet of humans, and particularly infants, is now well established (see e.g., WO 96/40106). Typical dietary sources of LC-PUFA are organ meats, fish, eggs and human breast milk. However, present day diets are frequently deficient in LC-PUFA, resulting in a need to supplement the diet with a source of LC-PUFA.

Sources of LC-PUFA supplements include egg yolk phospholipids, and triglyceride oils extracted from fish and marine microorganisms. The use of egg yolk phospholipids and/or marine triglyceride oils to supply LC-PUFA in infant formula is taught, e.g., in U.S. Pat. No. 4,670,285 and in WO 96/10922. The use of microbial triglyceride oils to supply LC-PUFA in infant formula is taught in U.S. Pat. Nos. 5,374,657, 5,397,591 and 5,550,156. Another source to supply LC-PUFA in infant formula is a lipid extract from human placenta, taught in European Patent No. 0 140 805.

Because of their degree of unsaturation, LC-PUFA are prone to oxidative degradation. Preserving the double bonds of the LC-PUFA through processing and storage is a critical issue in the preparation and distribution of infant formula, baby food and other foods and nutritional supplements containing such materials.

EP0404058 describes the addition of alpha-tocopherol and/or ascorbylpalmitate as antioxidants during the preparation of LC-PUFA-containing mixtures to reduce oxidative degradation. The LC-PUFA-containing materials are added to a mixture containing antioxidants in amounts to give final concentrations of from 150-300 ppm, and the mixture typically contains mono- and diglyceride emulsifiers. U.S. Pat. No. 5,855,944 describes a process for stabilizing LC-PUFA containing marine oils by treating the oils with silica, steam deodorizing the oil, and then adding to the oil a mixture of food-grade lecithin, alpha-tocopherol, and ascorbyl-palmitate in a total amount of 1000-4000 ppm of the mixture. EP2025237 describes the use of a composition comprising an LC-PUFA containing oil and lecithin, wherein the weight ratio of lecithin to LC-PUFA is at least about 25:75 to prevent, inhibit and/or stop the formation of fishy odours from an LC-PUFA containing oil.

Still, the reduction of the generation of fishy odours caused by oxidation of LC-PUFA containing oils remains an important technical issue to be solved. The inhibition of the very disturbing fishy off-odours in the final food products, are of great importance to the consumer. The formation of ppb amounts of fishy off-flavour compounds are sufficient to produce a strong fishy off-odour, even though the concentration of the precursor LC-PUFAs are not substantially reduced.

It would be desirable, if the prevention, inhibition, reduction and/or stopping of LC-PUFA oxidation was achieved by natural means, in particular by the use of a material from a plant source that has a healthy reputation and tradition.

Hence, there remains a need for an alternative, natural, consumer-friendly, inexpensive, and effective method for the inhibition of formation of fishy off flavours in compositions containing LC-PUFA.

Any reference to prior art documents in this specification is not to be considered an admission that such prior art is widely known or forms part of the common general knowledge in the field.

Consequently, it was the objective of the present invention to improve and/or enrich the state of the art and, in particular, to provide the art with a way to prevent, inhibit, reduce or stop the formation of fishy off flavours in compositions comprising LC-PUFA effectively and inexpensively by using a traditional plant ingredient with a healthy reputation, or to at least provide a useful alternative.

SUMMARY

The inventors were surprised to see that the objective of the present invention could be achieved by the subject matter of the independent claims. The dependent claims further develop the idea of the present invention.

Accordingly, the present invention provides a composition comprising at least one LC-PUFA containing oil and *Glycyrrhiza*, a part and/or an extract thereof.

Further, the present invention provides a product comprising at least one LC-PUFA containing oil and *Glycyrrhiza*, a part and/or an extract thereof.

Even further, the present invention provides a use of *Glycyrrhiza*, a part and/or an extract thereof in compositions comprising an LC-PUFA containing oil to at least partially prevent, inhibit, reduce and/or stop the oxidation of LC-PUFA in a composition.

As used in this specification, the words "comprises", "comprising", and similar words, are not to be interpreted in an exclusive or exhaustive sense. In other words, they are intended to mean "including, but not limited to".

The present inventors have shown that *Glycyrrhiza*, in particular micronized *Glycyrrhiza* roots and/or *Glycyrrhiza* extract, could be used to effectively prevent, inhibit, reduce or stop the formation of fishy off flavours in compositions comprising LC-PUFA. *Glycyrrhiza* was show to effectively prevent, inhibit, reduce or stop LC-PUFA oxidation.

Without wishing to be bound by theory, the present inventors currently believe that the effect of *Glycyrrhiza* to prevent the formation of fishy odours from LC-PUFA is due to *Glycyrrhiza*'s antioxidant properties.

*Glycyrrhiza* is a genus with several accepted species in the legume family (Fabaceae) that can be found almost globally, for example, in Asia, Australia, Europe, and the Americas. The present inventors have obtained the *Glycyrrhiza* that was used in the present invention from commercial sources, such as from Dixa AG, St. Gallen, Switzerland.

The *Glycyrrhiza* genus is best known for liquorice *G. glabra*, a species native to Eurasia and North Africa, from which most confectionery liquorice is produced. The liquorice root is one of the fundamental herbs used in traditional Chinese medicine and is used to harmonize other herbs, in particular, to reduce harsh effects of other herbs. Hence, in traditional Chinese medicine liquorice is commonly combined with other herbs in a single prescription, as a unique "guide drug" to enhance the effectiveness of other ingredients, to reduce toxicity, and to improve flavour in almost half of Chinese herbal formulas (J Ethnopharmacol. 2013 Dec. 12; 150(3):781-90). Hence, *Glycyrrhiza* is well-known for its health-benefits.

BRIEF DESCRIPTION OF DRAWINGS

FIG. 1 shows the concentration dependent antioxidation capacity of micronized licorice in fish oil.

FIG. 2 shows the antioxidation capacity of licorice extracts from different sources with different extraction solvents in fish oil.

FIG. 3 shows the concentration dependent antioxidation capacity of licorice extracts in fish oil.

FIG. 4 shows the induction periods in minutes for micronized licorice and licorice extracts in fish oil oxidation obtained by RapidOxy 100.

DETAILED DESCRIPTION

Consequently, the present invention relates in part to a composition comprising at least one LC-PUFA containing oil and *Glycyrrhiza*, a part and/or an extract thereof. The composition may be any composition that contains LC-PUFA. The composition may contain LC-PUFA naturally or may be enriched with LC-PUFA. For example, the composition may contain at least 0.01 weight-% LC-PUFA.

Any *Glycyrrhiza* may be used. For example, the *Glycyrrhiza* may be selected from the group consisting of *Glycyrrhiza acanthocarpa, Glycyrrhiza aspera, Glycyrrhiza astragalina, Glycyrrhiza bucharica, Glycyrrhiza echinata, Glycyrrhiza eglandulosa, Glycyrrhiza foetida, Glycyrrhiza foetidissima, Glycyrrhiza glabra, Glycyrrhiza gontscharovii, Glycyrrhiza iconica, Glycyrrhiza korshinskyi, Glycyrrhiza lepidota, Glycyrrhiza pallidiflora, Glycyrrhiza squamulosa, Glycyrrhiza triphylla, Glycyrrhiza uralensis*, or combinations thereof.

The source of the LC-PUFA is not critical for the subject matter of the present invention. Any such source that is known in the art can be used.

The skilled person generally knows sources of unsaturated fatty acids. Typical sources of DHA, for example, are fish oil or oils from micro organisms, such as Cryptecodinum *cohnii*. EP 0 515 460, for example, discloses a method for obtaining oil rich in DHA which is present in the biomass of cultivated dinoflagellates. WO 02/072742 discloses oils rich in DHA, ARA, DHGLA and EPA. A typical source of ARA, for example, is egg lecithin or biomass of fermentation processes (*Mortierella alpina*), the latter may be obtained according to the process disclosed in EP 0 568 608. If very pure preparations are desired, it may be advantageous to prepare the LC-PUFA containing fat or oil synthetically. However, generally it is preferred that the LC-PUFA containing oil is selected from the group consisting of a marine oil, an oil produced by microorganisms, an oil produced by one-celled plants, an oil produced by multi-cellular plants or an oil of animal origin, or mixtures thereof.

In one embodiment of the present invention, the LC-PUFA containing oil may be selected from the group consisting of a marine oil, an oil produced by microorganisms, an oil produced by one-celled plants, an oil produced by multi-cellular plants or an oil of animal origin, or mixtures thereof; and preferably may be fish oil.

The composition can be any composition where it is desired to avoid or stop LC-PUFA oxidation and/or the generation of fishy odors. For example, the composition might be a medicament or a cream for topical application. Preferably, however, the composition is a food composition.

The composition of the present invention may be enriched in unsaturated fatty acids, preferably in polyunsaturated fatty acids. The poly unsaturated fatty acids (PUFA) may include omega-3 fatty acids and omega-6 fatty acids. Typical examples of LC-PUFAs used in framework of the present invention include docosahexaenoic acid (DHA), arachidonic acid (ARA), linoleic acid, alpha-linolenic acid, eicosapentaenoic acid and/or erucic acid.

In a particular preferred embodiment of the present invention, the composition may be enriched in long chain poly unsaturated fatty acids. PUFA5 are considered LC-PUFAs, if the carbon chain comprises 18 C-atoms or more.

The composition in accordance with the present invention may be enriched in poly unsaturated fatty acids, preferably in long chain poly unsaturated fatty acids, even more preferred in C18, C20 and/or C22 co-6 polyunsaturated fatty acids. Hence, the composition of the present invention may be enriched in C18, C20 and/or C22 omega-6 polyunsaturated fatty acids. The weight ratio of omega-6 fatty acids and omega-3 fatty acids in the composition of the present invention is preferably between 1:2 to 8:1, more preferably between 4:1 to 8:1.

The polyunsaturated fatty acids may at least partially be present in form of free fatty acids. They may also at least partially be present in a mono-, di- and/or triglyceride form. This glyceridic form contributes to the stability of the PUFA and, hence, helps to avoid the generation of fishy odor.

It may also be advantageous, if the composition of the present invention further comprises another antioxidant. The type of antioxidant is not critical, however, in case the composition is a food product or a medicament, a food grade antioxidant is required. In cases where the composition is a product for topical administration, a food grade antioxidant is at least strongly preferred. Antioxidants may help in concert with *Glycyrrhiza* to avoid that LC-PUFAs are oxidized, which likely will lead to a loss of product value. As antioxidant with particular beneficial properties in terms of avoiding fish odor generation extracts of citrus fruits, in particular lemons, can be mentioned. Further examples of suitable antioxidants may be selected from the group consisting of ascorbic acid; glutathione; lipoic acid; uric acid; carotenoids, e.g., lycopene, carotene; tocopherols; ubiquinone; hydrochinone; polyphenolic antioxidants, e.g., resveratrol, flavonoids; ascorbylpalmitate; galates; BHA; BHT; TBHQ; sulfites; retinols; carotenoides; flavonoids; tea extracts; rosemary extracts; nitrites; EDTA, citric acid, phytic acid; derivatives and/or mixtures thereof.

The amount of antioxidant that can be used in the framework of the present invention is not particularly limited and will depend on the type of antioxidant used and on the amount of *Glycyrrhiza* and LC-PUFA present in the composition, for example. Those skilled in the art will be able to determine appropriate amounts. However, generally it is preferred if the antioxidant is added to the composition in an amount of about 0.001 weight-% to 1% weight-%, preferably of about 0.01 weight-% to 0.5 weight-% with respect to the total composition.

Hence, the composition in accordance with the present invention may further comprise an antioxidant, for example selected from the group consisting of ascorbic acid; glutathione; lipoic acid; uric acid; carotenoids, e.g., lycopene, carotene; tocopherols; ubiquinone; hydrochinone; polyphenolic antioxidants, e.g., resveratrol, flavonoids; ascorbylpalmitate; galates; BHA; BHT; TBHQ; sulfites; retinols; carotenoides; flavonoids; tea extracts; rosemary extracts; nitrites; EDTA, citric acid, phytic acid; derivatives and/or mixtures thereof. The antioxidant may be added to the composition in an amount of about 0.001 weight-% to 1% weight-%, preferably in an amount of about 0.01 weight-% to 0.5 weight-%.

In one embodiment of the present invention, the *Glycyrrhiza*, a part and/or an extract thereof may be provided as micronized *Glycyrrhiza*. Micronized *Glycyrrhiza*, for example micronized licorice, is commercially available from many sources.

Using micronized *Glycyrrhiza* has the advantage that the micronizing allows protection of all valuable active compounds in *Glycyrrhiza*, and avoids the need for extraction. No excipients need to be added and there is no need for the use of solvents. Whole plants or parts thereof can be micronized. Micronized *Glycyrrhiza* can be easily and precisely dosed.

Any part of a *Glycyrrhiza* plant may be used for the purpose of the present invention. However, in particular beneficial results have been obtained with the root of a *Glycyrrhiza* plant. Hence, for example, the *Glycyrrhiza*, a part and/or an extract thereof may be provided as the root of *Glycyrrhiza*, for example as the root of a *Glycyrrhiza uralensis* plant. It may also be provided as micronized root of a *Glycyrrhiza* plant. For example, it may be provided as micronized root of a *Glycyrrhiza uralensis* plant.

The subject matter of the present invention extends to a composition in accordance with the present invention, wherein the *Glycyrrhiza*, a part and/or an extract thereof is provided as *Glycyrrhiza* extract. The whole *Glycyrrhiza* plant or parts thereof may be extracted. For example, the *Glycyrrhiza* root may be extracted. The extract may be a water extract or an oil extract, for example. In one embodiment, the extract is an alcoholic extract. For the purpose of the present invention, an extract may be considered alcoholic, if the extraction solvent contains 50 weight-% or more alcohol. For example, the alcoholic extract may contain at least 60 weight-%, at least 70 weight-%, at least 80 weight-%, at least 90 weight-%, at least 95 weight-%, or at least 99 weight-% alcohol. Several alcohols may be used for the purpose of the present invention. Alcohols that are used routinely in extracting food materials are preferred. For example, the alcohol may be ethanol. Also, mixtures may be used as extraction solvents. For example, water/ethanol mixtures may be used. Typical water/ethanol mixtures may contain at least at least 50 weight-%, at least 60 weight-%, at least 70 weight-%, at least 80 weight-%, at least 90 weight-%, at least 95 weight-%, or at least 99 weight-% ethanol. After extraction, the extraction solvent, for example the alcohol, may be partially or completely removed from the extract, for example by drying or evaporation.

Any amount of *Glycyrrhiza* will be effective for the purpose of the present invention. The present inventors were surprised to see that compared to other available solutions to reduce the generation of fishy odour from LC-PUFA through unwanted oxidation, relatively little *Glycyrrhiza* was needed to achieve the objective of the present invention. The inventors have achieved best results, when the weight ratio of *Glycyrrhiza*, a part and/or an extract thereof to LC-PUFA was at least about 1:10; preferably at least about 1:5, more preferably between about 1:2 and 1:1.

In case the composition is not a raw material but a premix or product ready for consumption it may often also further comprise a carbohydrate source, a protein source, and/or a further fat source.

Hence, the composition of the present invention may be a food composition, optionally further comprising a carbohydrate source, and a protein source.

The term "food" shall mean for the purpose of the present invention in accordance with *Codex Alimentarius* any substance, whether processed, semi-processed or raw, which is intended for human consumption, and includes drink, chewing gum and any substance which has been used in the manufacture, preparation or treatment of "food" but does not include cosmetics or tobacco or substances used only as drugs.

The final product may comprise an amount of LC-PUFA that corresponds to the intended purpose of the product. A typical food composition may, however comprise, in percent by weight, 0.01-0.5%, preferably 0.015-0.4%, most preferably 0.02-0.2%, for example 0.06% of LC-PUFAs.

If the product is a nutritional composition, it may comprise other constituents, such as macro- and micronutrients, functional food ingredients, for example. It may comprise further lipids. Typical lipid sources that may be used include milk fat, safflower oil, egg yolk lipid, canola oil, olive oil, coconut oil, palm oil, palm kernel oil, palm olein, soybean oil, sunflower oil. Medium chain triglycerides (MCT), which are defined herein as triglycerides comprising fatty acids with acyl chains of 6-12 carbon atoms (C6-C12) may also be included.

Generally, fatty acids are preferably present in the form of triglycerides. They may, however, also be present in the form of free fatty acids, esters of other alcohols than glycerol or in the form of phospolipids. Hence, in the composition of the present invention the polyunsaturated fatty acids may be at least partially present in mono-, di- and/or triglyceride form.

In a final nutritional composition the lipids may provide 30-50%, preferably 35-45% of the total energy of the nutritional composition.

As protein or carbohydrate source, generally any protein source and/or carbohydrate source suitable as ingredients in nutritional compositions may be used.

The dietary protein, which may be used may be any suitable dietary protein; for example animal proteins (such as milk proteins, meat proteins and egg proteins); vegetable proteins (such as soy protein, wheat protein, rice protein, and pea protein); mixtures of free amino acids; or combinations thereof. Milk proteins such as casein and whey protein are particularly preferred. The protein may be intact, hydrolysed protein, partially hydrolysed protein, free amino acids or a mixture of these. The protein source preferably provides from about 7 to 25% of the energy of the composition, more preferably 7-15%, most preferably 8-13%.

If the nutritional composition includes a carbohydrate source, any carbohydrates suitable for use in nutritional compositions may be used, for example digestible carbohydrates, such as maltodextrin, maltose, sucrose, lactose, glucose, fructose, corn syrup, corn syrup solids, rice syrup solids, starch, such as cereal starch, rice starch, corn starch, and mixtures thereof. The carbohydrate source preferably provides about 30% to about 70%, preferably 40-60% of the energy of the nutritional composition, for example, if it is a complete nutritional composition.

Dietary fibre (non-digestible carbohydrates) may also be present in a nutritional composition according to the present invention if desired. Numerous types of dietary fibre are available. For example, oligosaccharides, such as fructo-oligo-saccharides, galactooligosaccharides, xylo-oligosac-charides, fuco-oligosaccharides, manno-oligosaccharides, just to mention a few, may be added.

The composition may comprise further ingredients, which are designed to meet the nutritional needs of the particular human being, or provide further benefits or functionalities. For example, the composition is preferably "nutritionally complete", that is it contains adequate nutrients to sustain healthy human life for extended periods. Preferably, the composition comprises vitamins and minerals. Also trace elements may be supplied.

If necessary, the product may contain emulsifiers and stabilisers such as citric acid esters of mono- and di-glycerides. The emulsifier may be selected from the group consisting of mono- and di-glycerides, acetic acid esters of mono/di-glycerides, lactic acid esters of mono/di-glycerides, diacetyl tartaric acid esters of mono/di-glycerides, succinic acid esters of mono glycerides, sorbitan esters, sucrose esters, polyglycerol esters, calcium stearoyl lactate and mixtures thereof.

The product may optionally contain other substances, which have a beneficial effect, such as lactoferrin, nucleo-tides and/or nucleosides.

A nutritional composition may further comprise a probi-otic micro organism, preferably selected from the geni *Bifidobacterium, Lactobacillus, Strepotococcus*, and mix-tures of these.

The higher the content of LC-PUFA in a composition, the more a protection against unwanted fishy odour generation is needed. Of course, depending on whether the composition is a raw material, a pre-mix, a nutritional supplement, a food composition for special purposes of a general food compo-sition, the LC-PUFA content will vary greatly, and the subject matter of the present invention can be used for all these purposes. Typically, however, in the composition in accordance with the present invention, the long chain poly unsaturated fatty acids may represent about 1-75 weight-% of the composition, preferably about 3-50 weight-% of the composition, most preferred about 5-35 weight-% of the composition.

The subject matter of the present invention also comprises products comprising the composition of the present inven-tion. The product may be a food product for example. The product may be a LC-PUFA containing raw material, in particular a marine oil, an oil produced by microorganisms, an oil produced by one-celled plants, an oil produced by multi-cellular plants or an oil of animal origin, a nutritional complete formula, a dairy product, a chilled or shelf stable beverage, a mineral or purified water, a liquid drink, a soup, a dietary supplement, a meal replacement, a nutritional bar, a confectionery, a milk or a fermented milk product, a yoghurt, a milk based powder, an enteral nutrition product, an infant formula, an infant nutritional product, a cereal product or a fermented cereal based product, an ice-cream, a chocolate, coffee, a culinary product such as mayonnaise, tomato puree or salad dressings, a health care product, a cosmetic product, a pharmaceutical product, or a pet food.

The subject matter of the present invention also extends to the use of *Glycyrrhiza*, a part and/or an extract thereof in compositions comprising an LC-PUFA containing oil to at least partially prevent, reduce, inhibit and/or stop the oxi-dation of LC-PUFA in a composition.

The subject matter of the present invention further extends to the use of *Glycyrrhiza*, a part and/or an extract thereof to at least partially prevent, inhibit and/or stop the formation of fishy odours; for example to at least partially prevent, inhibit and/or stop the formation of fishy odours by at least partially preventing, reducing, inhibiting and/or stopping the oxidation of LC-PUFA in a composition.

For these uses of the present invention, *Glycyrrhiza*, a part and/or an extract thereof may be used in the composition in a weight ratio of *Glycyrrhiza*, a part and/or an extract thereof to LC-PUFA of at least about 1:10; preferably at least about 1:5, more preferably between about 1:2 and 1:1.

The composition may be the composition described in the present invention. Similarly, *Glycyrrhiza* may be used as described for the composition of the present invention.

Those skilled in the art will understand that they can freely combine all features of the present invention disclosed herein. In particular, features described for the composition or the product of the present invention may be combined with the use of the present invention and vice versa. Further, features described for different embodiments of the present invention may be combined.

Although the invention has been described by way of example, it should be appreciated that variations and modi-fications may be made without departing from the scope of the invention as defined in the claims.

Furthermore, where known equivalents exist to specific features, such equivalents are incorporated as if specifically referred in this specification. Further advantages and fea-tures of the present invention are apparent from the figures and non-limiting examples.

Examples

1) Materials

Licorice root (*Glycyrrhizae glabra* L.) nat PhEur pow-dered was purchased from Dixa AG (St. Gallen, 9014 Switzerland). As comparison, licorice root was purchased from a local Asia market and micronized in-house. Licorice extracts were produced with two solvents, ethanol and ethanol/water (1/1, v/v) in-house from licorice purchased from Dixa and from licorice purchased from a local Asia market. A commercial available licorice extract (95% etha-nol) was provided by Shaanxi Kingsci Biotechnology Co., Ltd (Xi'an, 710018 China). Un-stabilized fish oils, and stabilized fish oils including high DHA NIF fish oils and high EPA NAD fish oils were provided by Sofinol (Sofinol S.A., Manno TI, Switzerland).

2) Methods 2.1 Shelf Life Storage and Sensory Evaluation

Samples containing 1 g Fish oil and 1 g micronized licorice were prepared and mixed by vortexing. For an oxidation test, a shelf life storage at controlled temperature (39° C.) was carried out in an incubator oven for two weeks. The sniffing tests were done by an untrained panel consisting of 4 people at day 0, day 7 and day 14 on fishiness and other oxidative off-flavors.

2.2 Oxidation Stability by Rapidoxy 100

RapidOxy 100 (Anton Paar Switzerland AG, Buchs, Swit-zerland) was used to determine the oxidation stability of fish oil supplemented with micronized licorice and licorice extracts under accelerated conditions, such as increased temperature and exposure to excess of pure oxygen. Samples contain 2 g Fish oil and vary amount of micronized licorice or licorice extracts (Table 1) were prepared in glass dishes and homogenized by hand mixing. The glass dish was then put in a stainless steel test chamber. In the test chamber, the temperature was kept constantly at 120° C., the pressure is continuously traced. Due to the oxygen consumption the pressure drops. The time used to reach the 10% pressure drop is called "induction period (IP)", and it is an indication of the antioxidant capacity. The longer the time, the stronger the antioxidant capacity, and vice versa.
3) Results The sniffing test results at day 7 and day 14 from all panelists demonstrated that fish oil samples stabilized with micronized licorice did not generate characteristic oxidized fish oil smell, i.e., rancid, salty fish, pungent smell compared to the non-stabilized fish oil sample. In addition, it had a positive, pleasant herbal odor.

Micronized licorice showed a concentration dependent antioxidant capacity (FIG. 1). A sample containing 0.25 g licorice and 2 g fish oil showed a similar IP compared to the commercially available NIF oil and NAD oil (FIG. 1, light grey line). A sample containing 0.2 g licorice and 2 g fish oil demonstrated an increased antioxidant capacity compared to the nonstabilized fish oil (FIG. 1, black line).

Licorice extracts from three different sources and using different extract solvents were studied (FIG. 2). The antioxidant effect varied based on the source of the licorice. The inventors currently assume that is due to a difference in quality of licorice obtained from different sources. The antioxidant effect also depended on the extraction solvent used. 100% ethanol performed better than an ethanol/water (1/1, v/v) mixture as extraction solvent. A commercial extract from China with 95% ethanol showed very good results.

The minimum concentration of a mainly alcoholic licorice extract (Xi'an, 710018 China) to protect fish oil from oxidation was studied (FIG. 3). 2 mg, 5 mg, 10 mg and 17 mg of the extract were added to 2 g fish oil separately, and measured by RapidOxy 100. 17 mg licorice extract (1:117 w/w in fish oil) showed antioxidant capacity equivalent to 0.5 g micronized licorice. 5 mg licorice extract (1:400 w/w in fish oil) had still a higher antioxidant capacity than the commercial NIF oil and NAD oil. 2 mg licorice extract (1:1000 w/w in fish oil) still demonstrated a noticeable antioxidant effect compared to non-stabilized fish oil.

The invention claimed is:

1. A composition comprising (i) at least one oil comprising long chain polyunsaturated fatty acids (LC-PUFA) and (ii) micronized root of *Glycyrrhiza*, wherein the composition comprises the LC-PUFA in an amount of about 5-35 weight % of the composition, and wherein a weight ratio of the micronized root of *Glycyrrhiza* to the LC-PUFA is between about 1:2 and 1:1.

2. The composition in accordance with claim 1, wherein the at least one oil is selected from the group consisting of a marine oil, an oil produced by microorganisms, an oil produced by one-celled plants, an oil produced by multicellular plants or an oil of animal origin, and mixtures thereof.

3. The composition in accordance with claim 1, wherein the composition is a food composition.

4. The composition in accordance with claim 1, wherein the LC-PUFA are at least partially present in mono-, di- and/or triglyceride form.

5. The composition in accordance with claim 1, the composition further comprising an antioxidant in an amount of about 0.001 weight % to 1 weight %.

6. The composition in accordance with claim 1, wherein the composition does not contain any fat source additional to the micronized root of *Glycyrrhiza* and the at least one oil comprising long chain polyunsaturated fatty acids.

7. The composition in accordance with claim 5, wherein the composition comprises about 0.01 weight % to 0.5 weight % of the antioxidant.

8. The composition in accordance with claim 5, wherein the antioxidant is selected from the group consisting of glutathione, lipoic acid, uric acid, carotenoids, lycopene, carotene, ubiquinone, polyphenolic antioxidants, resveratrol, flavonoids, galates, sulfites, retinols, nitrites, EDTA, citric acid, phytic acid, and mixtures thereof.

9. A product comprising a composition comprising (i) at least one oil comprising long chain polyunsaturated fatty acids (LC-PUFA) and (ii) micronized root of *Glycyrrhiza*, wherein the composition comprises the LC-PUFA in an amount of about 5-35 weight % of the composition, wherein a weight ratio of the micronized root of *Glycyrrhiza* to the LC-PUFA is between about 1:2 and 1:1, and wherein the product is selected from the group consisting of a LC-PUFA containing raw material, a nutritional complete formula, a dairy product, a chilled or shelf stable beverage, a mineral or purified water, a liquid drink, a soup, a dietary supplement, a meal replacement, a nutritional bar, a confectionery, a milk or a fermented milk product, a yoghurt, a milk based powder, an enteral nutrition product, an infant formula, an infant nutritional product, a cereal product or a fermented cereal based product, an ice-cream, a chocolate, coffee, a culinary product, tomato puree or salad dressings, a health care product, a cosmetic product, a pharmaceutical product, and a pet food.

10. The product in accordance with claim 9, wherein the product is mayonnaise.

11. The product in accordance with claim 9, wherein the product further comprises a carbohydrate source and a protein source.

12. The product in accordance with claim 11, wherein the protein source is a milk protein.

13. A method to prevent, reduce, inhibit and/or stop oxidation of LC-PUFA in a composition comprising (i) at least one oil comprising long chain polyunsaturated fatty acids (LC-PUFA) and (ii) micronized root of *Glycyrrhiza*, wherein the composition comprises the LC-PUFA in an amount of about 5-35 weight % of the composition, and wherein a weight ratio of the micronized root of *Glycyrrhiza* to the LC-PUFA is between about 1:2 and 1:1, the method comprising:

mixing the micronized root of *Glycyrrhiza* with the at least one oil comprising LC-PUFA.

* * * * *